United States Patent [19]
Chen et al.

[11] Patent Number: 5,157,951
[45] Date of Patent: Oct. 27, 1992

[54] STEERING LOCK

[75] Inventors: Kenneth Chen; Jesse Huang, both of Taipei, Taiwan

[73] Assignee: Interflow Corp., Taipei, Taiwan

[21] Appl. No.: 799,983

[22] Filed: Nov. 29, 1991

[51] Int. Cl.⁵ ............................................. B60R 25/02
[52] U.S. Cl. ....................................... 70/209; 70/238; 70/226
[58] Field of Search .................................. 70/209–211, 70/215, 225, 226, 238, 252

[56] References Cited

U.S. PATENT DOCUMENTS

| | | | |
|---|---|---|---|
| 4,730,470 | 3/1988 | Zane et al. | 70/211 X |
| 4,747,279 | 5/1988 | Solow | 70/238 |
| 4,825,671 | 5/1989 | Wu | 70/211 X |
| 4,887,443 | 12/1989 | Wang | 70/209 |
| 4,974,433 | 12/1990 | Wang | 70/211 |
| 5,031,428 | 7/1991 | Jan et al. | 70/209 |
| 5,033,281 | 7/1991 | Kofman et al. | 70/209 X |
| 5,038,667 | 8/1991 | Slater | 70/238 X |
| 5,040,388 | 8/1991 | Chen | 70/209 |
| 5,042,278 | 8/1991 | Wang | 70/209 |
| 5,062,282 | 11/1991 | Rong | 70/211 X |

Primary Examiner—Renee S. Luebke
Assistant Examiner—Suzanne L. Dino
Attorney, Agent, or Firm—Jacobson, Price, Holman & Stern

[57] ABSTRACT

A steering lock comprising a lock bar having one end pivotably secured to an U-shaped plate at a hooked end of an actuating bar and an opposite end attached with a forked stop bar through screw joint, wherein said lock bar is locked in line with said actuating bar by a lock cylinder in said U-shaped plate when the forked end of said forked stop bar and the hooked end of said actuating bar are respectively stopped at the periphery of a steering wheel at two opposite locations.

2 Claims, 4 Drawing Sheets

STEERING LOCK

BACKGROUND OF THE INVENTION

The present invention relates to steering locks and relates more particularly to a steering lock which comprises a lock bar having a forked stop bar attached thereto at one end through screw joint and a projecting block at an opposite end pivoted to an U-shaped plate at a hooked end of an actuating bar, and a lock cylinder fastened in said U-shaped plate and controlled by a key to lock said lock bar in place when said lock bar is disposed in line with said actuating bar.

Several steering locks have been known for fastening the steering wheel of a motor vehicle. Regular steering locks are generally made in a telescopic structure. They are commonly comprised of a hooked extension rod and a lock bar that slide with one inside the other. The hooked extension rod has a plurality of retaining grooves spaced from one another and inserted through a lock body into a hole in the lock bar. By means of a lock cylinder in a lock body, the hooked extension rod can be fastened in the lock bar at the desired length. These steering locks are not satisfactory in use because of the following disadvantages.

1) They are complicated to operate. During each installation process, the hooked extension rod shall be pulled out of the lock bar and adjusted to the suitable length and then, locked in position.

2) Gap may happen between the hooked extension rod and the periphery of the steering wheel to affect locking effect. Because the hooked extension rod can only be moved in longitudinal direction relative to the lock bar and locked at either positions according to the pitch between the retaining grooves thereon, it is difficult to tightly attach the hooked portion of the hooked extension rod to the periphery of the steering wheel.

3) They occupy much space when not in use. Because the hooked extension rod has a hooked portion for hooking on a steering wheel, it can not be completely set inside the lock bar when it is not in use.

SUMMARY OF THE INVENTION

The present invention has been accomplished to eliminate the aforesaid disadvantages. It is therefore an object of the present invention to provide a steering lock which is easy to operate and practical in use. It is still another object of the present invention to provide a steering lock which can be conveniently collapsed to greatly reduce space occupation.

According to one aspect of the present invention, there is provided a steering lock generally comprised of a lock bar, an actuating bar and a stop bar, wherein said lock bar has an inner thread at one end for fastening said stop bar and a projecting block pivoted to an U-shaped plate at a hooked end of said actuating bar; said stop bar has a screw rod at one end screwed into said inner thread and locked in place by a lock nut, and a forked plate at an opposite end for stopping against the periphery of a steering wheel. By means of the control of the lock nut, the total length of the lock bar and the stop bar can be conveniently adjusted.

According to another aspect of the present invention, the actuating bar has a hook attached with an U-shaped plate for connecting the lock bar through pivot joint, which U-shaped plate has a lock cylinder fastened therein for locking the lock bar at a locked position in line with the actuating bar permitting the forked plate of the stop bar and the hook of the actuating bar to be respectively hooked on the periphery of a steering wheel at two opposite locations.

DETAILED DESCRIPTION OF THE PREFERRED EMBODIMENT

Figure 1:
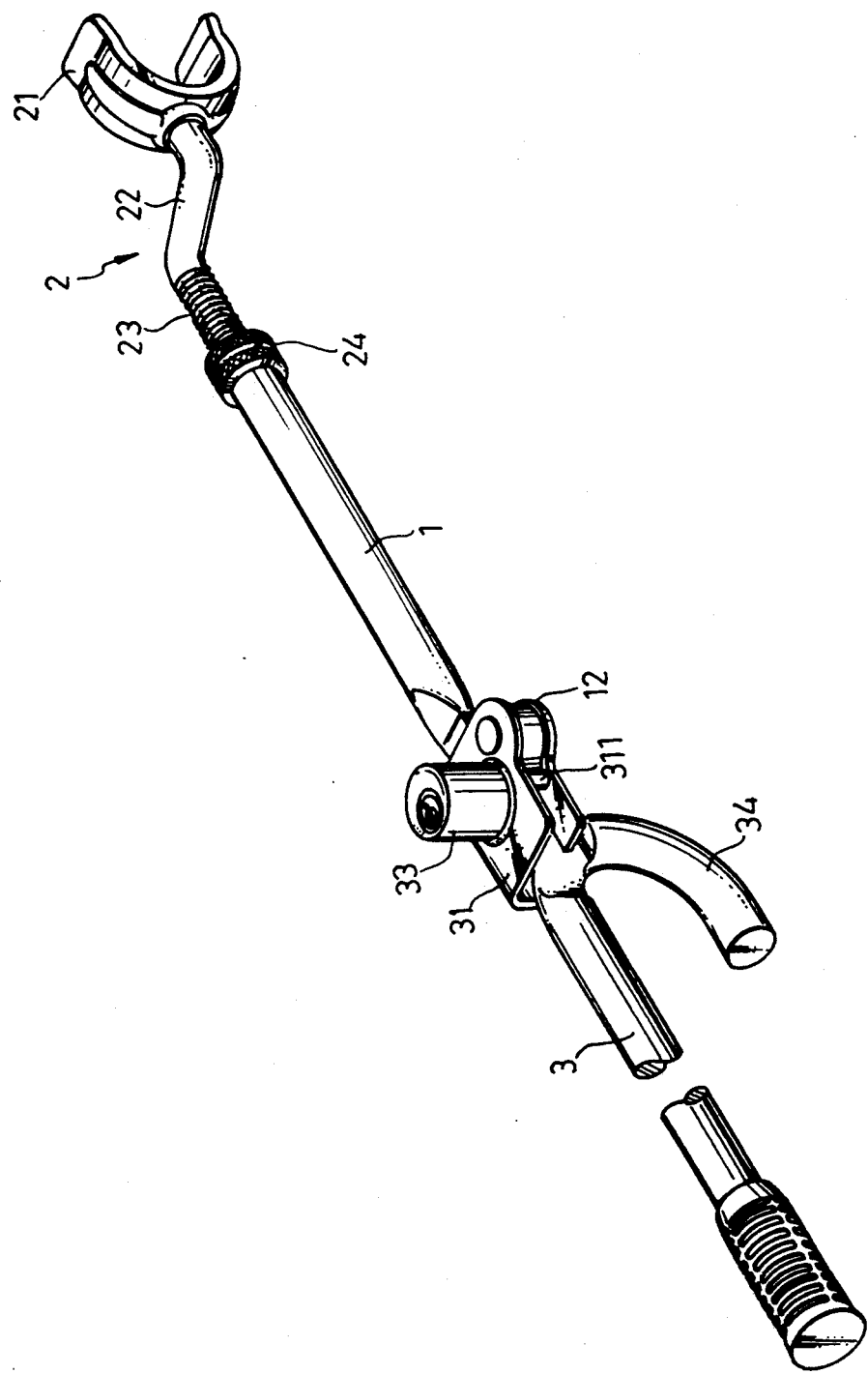
FIG. 1 is a perspective view of a steering lock embodying the present invention.
Figure 2:
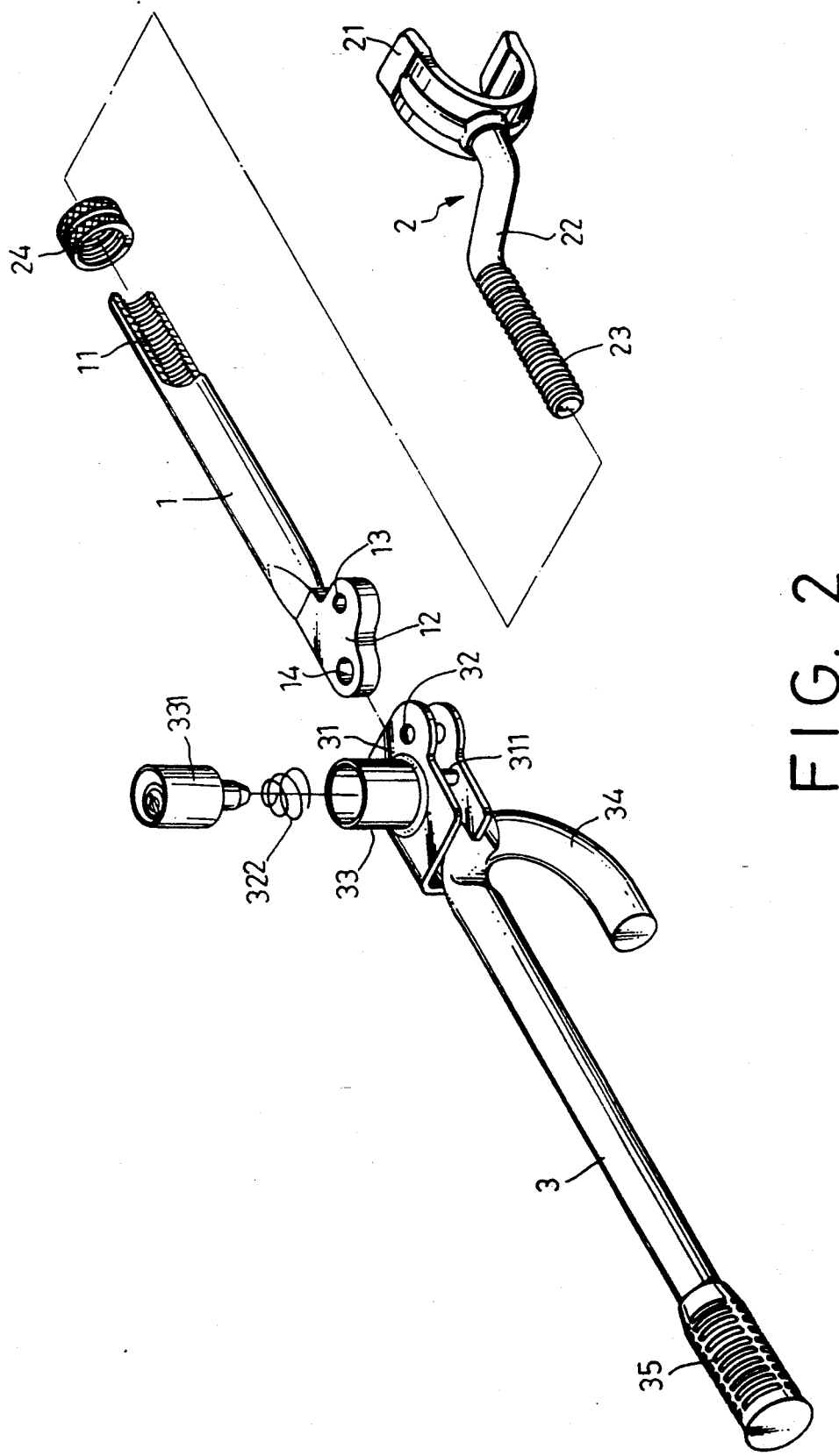
FIG. 2 is an exploded perspective view thereof.

Referring to FIGS. 1 and 2, therein illustrated is a steering lock embodying the present invention which is generally comprised of a lock bar 1, a stop bar 2, and an actuating rod 3. The lock bar 1 has an inner thread 11 at one end and a projecting block 12 at an opposite end, wherein said projecting block 12 has a pivot hole 13 and a lock hole 14 thereon. The stop bar 2 comprises a forked plate 21 at one end, a screw rod 23 at an opposite end which has a screw nut 24 mounted thereon, and a curved connecting rod 22 connected therebetween. The actuating rod 3 has an U-shaped plate 31 and a hook 34 at one end and a hand-hold 35 at an opposite end. The U-shaped plate 31 comprises a locating post 31 at the inside, a pivot hole 32 and a lock body 33 at the top, which lock body 33 has a lock cylinder 331 and a spring 322 fastened therein.

The assembly process of the present invention is outlined hereinafter with reference to FIGS. 1 and 2 again. The projecting block 12 of the lock bar 1 is inserted in the U-shaped plate 31 and pivotably secured thereto by fastening a lock pin (not shown) into the pivot holes 13, 32. Therefore, the actuating bar 3 is pivoted to the lock bar 1 at one end, and the lock bar 1 can be stopped by the locating post 311 at a position longitudinally aligned with the actuating bar 3. After the lock nut 24 having been moved onto the curved connecting rod 22 of the stop bar 2 and, the screw rod 23 is screwed into the inner thread 11 of the lock bar 1, and then, the lock nut 24 is screwed tight on the stop bar 2 to firmly secure the stop bar 2 to the lock bar 1. At the last, the spring 322 and the lock cylinder 331 are properly fastened inside the lock body 33.

Figure 3:
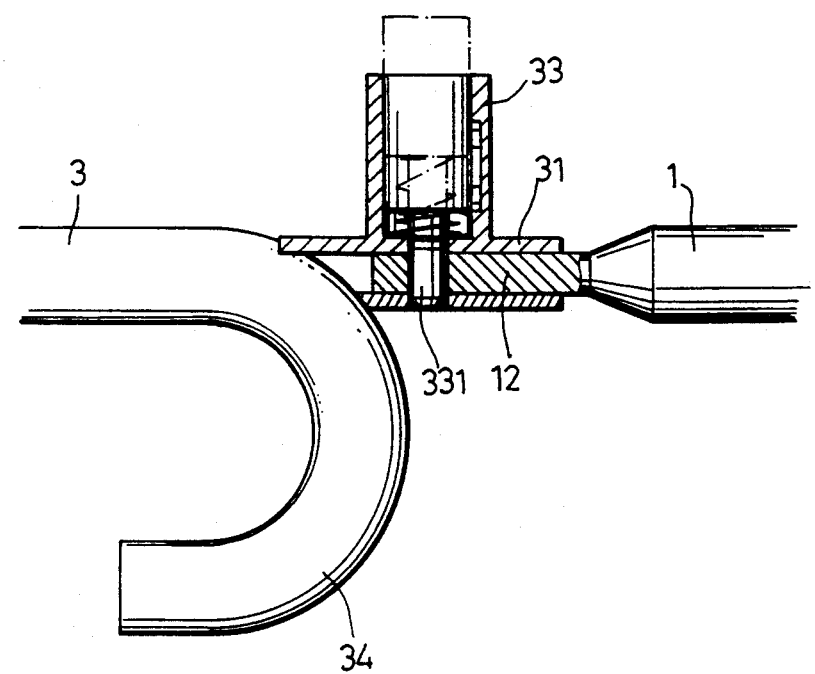
FIG. 3 is a partly sectional view thereof showing the operation of the lock cylinder.
Figure 4:
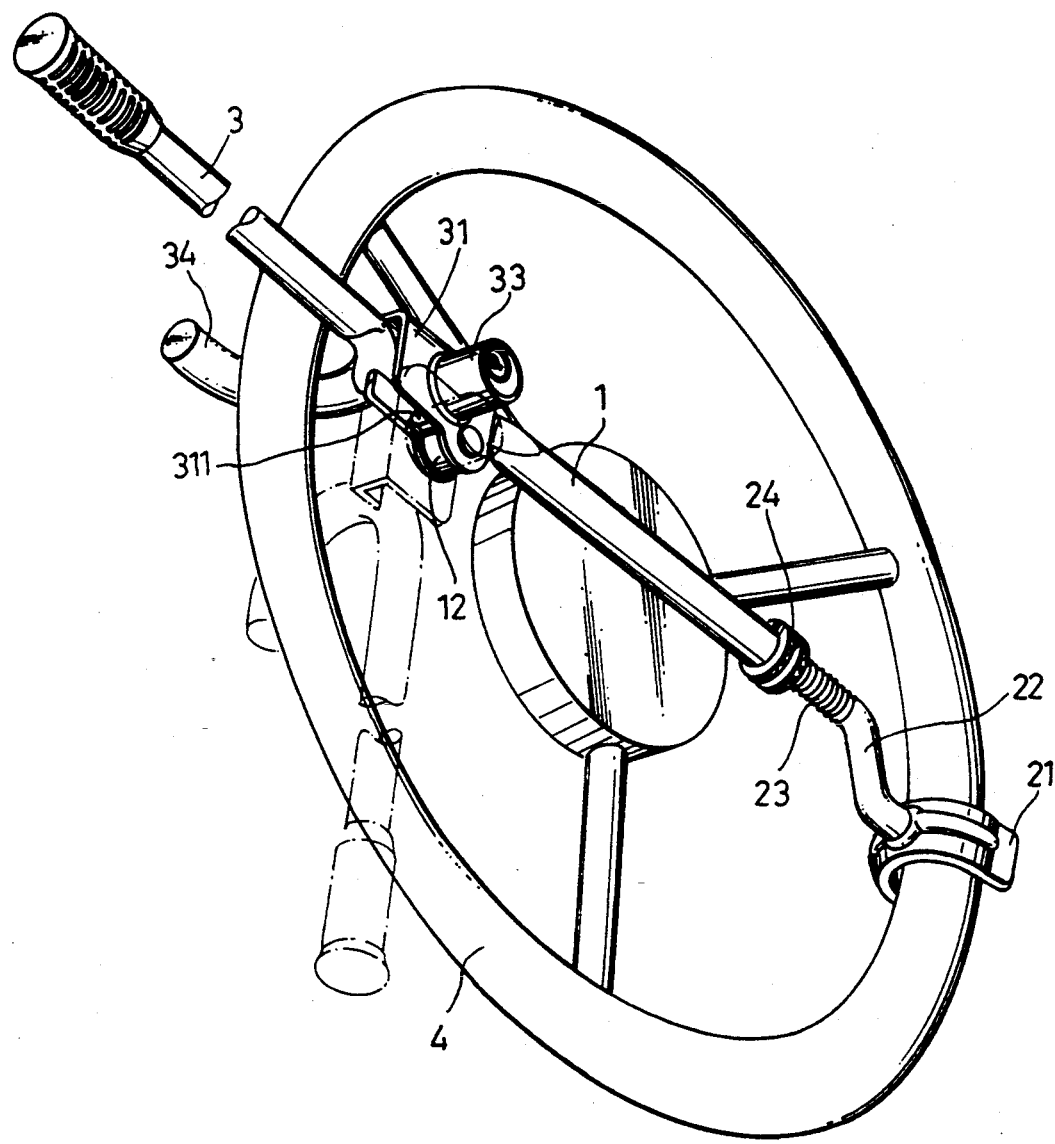
FIG. 4 illustrates the mounting process of the present invention in locking up a steering wheel.

The operation of the present invention is quite simple and described hereinafter with reference to FIGS. 3 and 4. The forked plate 21 of the stop bar 2 is stopped against the periphery of a steering wheel 4 to be locked, then, the actuating bar 3 is rotated to the position in line with the lock bar 1 permitting the hook 34 to hook on the periphery of the steering wheel 4 at a location opposite to the forked plate 21, and then, the lock cylinder 331 is pressed downward causing the spindle (not indicated) thereof to lock into the lock hole 14 on the projecting block 12. Therefore, the steering lock becomes locked in the steering wheel 4. Because the hand-hold 35 of the actuating bar 3 protrudes beyond the periphery of the steering wheel 4 at distance, the rotary motion of the steering wheel 4 is prohibited within a short range.

Detaching the steering lock from the steering wheel 4 is also very easy. Please refer to FIG. 4 again. Unlocking the lock cylinder 331 by a key causes the spring 332 to automatically push the spindle of the lock cylinder 331 out of the lock hole 14, and therefore, the actuating bar 3 can be rotated away from the periphery of the steering wheel 4 toward the lock bar 1. Once hook 34 of the actuating bar 3 is released from the periphery of the steering wheel 4, the steering lock can be directly removed from the steering wheel 4.

What is claimed is:

1. A steering lock comprising a lock bar having one end pivoted to an actuating bar to be locked in line with said actuating bar by locking device and an opposite end attached with a stop bar, the lock further comprising:

an inner thread at one end of the lock bar for connecting said stop bar, and a projecting block at an opposite end of the lock bar, said projecting block having a pivot hole pivotably secured to said locking device and a lock hole releasably locked in said locking device;

a screw rod at one end of the stop bar screwed into said inner thread and secured in place by a lock nut, and a forked plate at an opposite end of the stop bar to be stopped against the periphery of a steering wheel at a suitable location; and a hook at one end of the actuating bar to be releasably hooked on the periphery of said steering wheel opposite to said forked plate;

said locking device being fixedly secured to said hook of said actuating bar and comprised of an U-shaped plate, said U-shaped plate having a pivot hole pivotably secured to the pivot hole on said projecting block by a lock pin and a lock cylinder controlled by a key to lock into said lock hole permitting said lock bar to be firmly retained in line with said actuating bar.

2. A steering lock as claimed in claim 1 further including a hand hold at an opposite end of the actuating bar.

* * * * *